United States Patent [19]

Warner et al.

[11] 4,050,134
[45] Sept. 27, 1977

[54] METHOD FOR REMOVING ROTATABLE BLADES WITHOUT REMOVING THE CASTING OF A TURBINE

[75] Inventors: Ronald E. Warner, Media; Francis J. Healey, Ridley Park; Abel D. Grijalba, Swarthmore, all of Pa.

[73] Assignee: Westinghouse Electric Corporation, Pittsburgh, Pa.

[21] Appl. No.: 702,258

[22] Filed: July 2, 1976

Related U.S. Application Data

[62] Division of Ser. No. 518,909, Oct. 29, 1974, Pat. No. 3,986,793.

[51] Int. Cl.² ............... B23P 15/04; B23P 7/00
[52] U.S. Cl. .............. 29/156.8 R; 29/401 F
[58] Field of Search .......... 29/156.8 R, 156.8 B, 29/401 F, 401 R; 416/219 R, 220, 221, 219 A, 193 A, 212

[56] References Cited

U.S. PATENT DOCUMENTS

| 417,865 | 12/1889 | Green | 416/219 |
|---|---|---|---|
| 1,719,415 | 7/1929 | Back | 416/219 |
| 1,720,729 | 7/1929 | Hanzlik | 416/219 |
| 1,793,468 | 2/1931 | Densmore | 416/219 |
| 1,890,581 | 12/1932 | Kohler | 416/219 |
| 2,994,507 | 8/1961 | Keller et al. | 416/221 |
| 3,378,230 | 4/1968 | Toomey | 416/221 |
| 3,894,324 | 7/1975 | Holzapfel | 29/156.8 R |

FOREIGN PATENT DOCUMENTS

| 767,990 | 5/1955 | Germany | 416/219 |
|---|---|---|---|
| 278,022 | 9/1930 | Italy | 416/220 |
| 535,544 | 11/1955 | Italy | 416/219 |
| 725,461 | 3/1955 | United Kingdom | 416/220 |

*Primary Examiner* — C.W. Lanham
*Assistant Examiner* — Daniel C. Crane
*Attorney, Agent, or Firm* — G. H. Telfer

[57] ABSTRACT

A rotor for an axial flow, elastic fluid turbine apparatus. The rotor has a rotating shaft having a plurality of circumferentially spaced rotating blades thereon. Each blade has a platform portion having a convex arcuate surface and a concave arcuate surface. The convex arcuate surface has a radius greater than the radius of the concave arcuate surface so that individual rotating blades can be removed without removing the casing.

10 Claims, 4 Drawing Figures

METHOD FOR REMOVING ROTATABLE BLADES WITHOUT REMOVING THE CASTING OF A TURBINE

This is a division of application Ser. No. 518,909 filed Oct. 29, 1974, now U.S. Pat. No. 3,986,793.

BACKGROUND OF THE INVENTION

1. Field of the Invention

This invention relates to an axial flow, elastic fluid turbine apparatus and in paticular, to an improved rotating blade structure to allow removal of an individual blade from the last rotating blade row in the turbine apparatus.

2. Description of the Prior Art

In the prior art, repair of damage rotating blades in the last rotating blade row in an axial flow, elastic fluid, turbine apparatus is a time consuming and expensive process. The cost emanates not only from the requirement that a portion of the turbine casing first be removed in order to remove the damaged blade, but also from the necessary shut-down time period during which the turbine apparatus is inoperative.

The necessity of opening the turbine casing, and the overall plant shut-down incident thereto, results primarily from the fact that no efficient turbine blade structure which facilitates removal of the damaged blades from the last rotating blade row without dismantling the casing is known to the prior art.

In the prior art, each rotating blade is usually comprised of a curved root portion connected to a platform portion having an air foil portion extending radially outward therefrom.

The platform has a convex arcuate surface and a concave arcuate surface thereon. Both the convex arcuate surface and the concave arcuate surface of the platform portion of the rotating blades have an equal radius. The blades, when disposed a predetermined circumferential distance from each other on the rotor shaft, interfere with each other to prohibit any axial movement of one blade with respect to the other.

Axial movement of blades in the last rotating blade row in the direction of the axial flow of steam, that is, toward the turbine exhaust, is prohibited by interference which occurs between the convex arcuate surface of the platform of one rotating blade abutting against the concave arcuate surface of an adjacent rotating blade. The interference between rotating blades occurs at approximately the platform center line. Since provision of the arcuate surfaces of the platform portion of the rotating blades having substantially equal radii prohibited axial movement of one rotating blade relative to another in the direction of the turbine exhaust, removal of damaged rotating blades from the last rotating blade row could only be effectuated by first dismantling a portion of the turbine outer casing, with the attendant shutdown expense and time delay.

SUMMARY OF THE INVENTION

This invention disposes a predetermined number of rotating blades on a rotating shaft member within a casing of an axial flow elastic fluid apparatus. Each rotating blade has a platform portion having a convex arcuate surface and a concave arcuate surface thereon. The convex arcuate surface of the platform portion of the rotating blades has a predetermined radius greater than the radius of the concave arcuate surface of the platform portion of the rotating blade. When disposed on the shaft, adjacent rotating blades have a greater circumferential spacing between the center points of adjacent platforms than the circumferential spacing between adjacent trailing edges.

By providing a rotating blade with arcuate surfaces on the platforms thereof having different radii, interference between adjacent blades is eliminated, thus permitting axial movement of one rotating blade relative to another toward the turbine exhaust hood. Since axial motion of one rotating blade relative to another is permitted, blades in the last rotating blade row embodying the teachings of this invention can be removed from the rotor shaft without the necessity of first dismantling the turbine casing. Further, since the turbine casing need not first be dismantled to remove the damaged rotating blades from the last blade row, the down-time of the overall power plant is greatly reduced, with a concomitant saving in repair expense.

It is an object of this invention to provide a rotating blade for the last blade row of an axial flow elastic fluid turbine apparatus that has a platform portion with a convex arcuate surface and a concave arcuate surface having differing radii. Provision of rotating blades embodying the teachings of this invention permits axial movement of one rotating blade relative to another so as to facilitate removal of damaged rotating blades from the last rotating blade row without the necessity of dismantling a portion of the turbine cover prior to removal of the damaged blade.

BRIEF DESCRIPTION OF THE DRAWINGS

The invention will be more fully understood from the following detailed description of an illustrative embodiment, taken in connection with the accompaying drawings, in which.

DESCRIPTION OF THE PREFERRED EMBODIMENT

Figure 1:
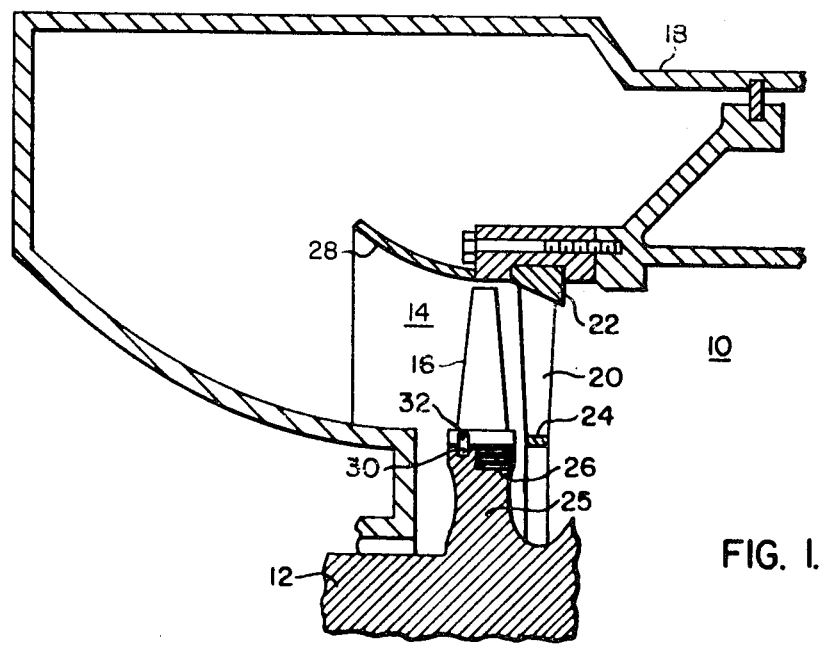
FIG. 1 is an elevational view partially in section of the low pressure stage of an axial flow elastic fluid turbine.

Throughout the following description, similar reference characters refer to similar elements in all figures of the drawings.

FIG. 1 shows an elevational view, partially in section, of a low pressure stage of an axial flow steam turbine 10. The turbine 10 has a rotor 12, a last blade row 14 comprising a plurality of circumferentially spaced rotating blades 16 fastened to the rotor 12, a casing 18 encircling the rotating blades 16 and the rotor 12, and an annular array of circumferentially spaced nozzle blades 20. The nozzle blades 20 are fastened to the casing 18 by an internal cylinder 22. As shown in FIG. 1, the stationary nozzle blades 20 of the annular array of nozzle blades are fastened together adjacent the rotor 12 by a shroud ring 24 subtending the annular array of stationary nozzle blades 20.

The rotor 12 is an elongated, substantially cylindrical, shaft member having a disc portion 25 thereon. The disc portion 25 has a plurality of substantially axially extending grooves 26 disposed about the circumference of the rotor shaft 12. The grooves 26 are spaced a predetermined circumferential distance from each other, and extend around the circumference of the disc portion 25 of the rotor shaft 12 in an axial location intermediate between the axial location of the nozzle blades 20 and a diffuser 28 leading to a condenser element (not shown). Thus, the rotating blades 16 in the last rotating blade row 14 are disposed in the grooves 26 and are axially disposed in the turbine 10 so as to be adjacent to the diffuser element 28.

A circumferential groove 30 extends about the disc portion 25 of the rotor shaft 12, the groove 30 intersecting the axial grooves 26 disposed in the rotor shaft 12. The groove 30 receives a pin member 32 which anchors each of the blades 16 to the shaft 12.

Figure 2:
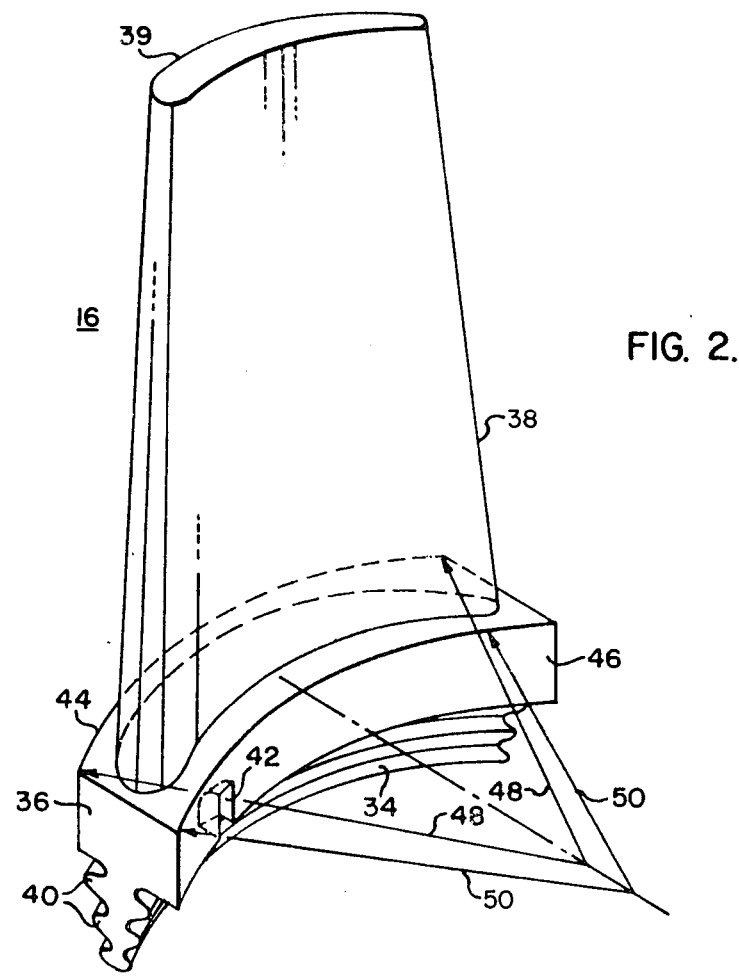
FIG. 2 is a perspective view of a rotating blade embodying the teachings of the invention.

Referring now to FIG. 2, a perspective view of one of the pluality of rotating blades 16 comprising the last blade row 14, (FIG. 1) and embodying the teachings of this invention, is illustrated.

The rotating blade 16 has a root portion 34 connected to a platform portion 36, the platform portion 36 having an airfoil portion 38 extending radially outward therefrom. The airfoil portion 38 terminates in a blade tip 39.

The root portion 34 is a side entry type root configuration and has a plurality of tangs 40 which provide the root portion 34 with a serrated cross-section. The root portion 34 is curved and is received by the groove 26 disposed in the disc portion 25 of the rotor shaft 12 (FIG. 1). Engagement of the curved root portion 34 with the generally axial groove 26 disposed in the rotor shaft 12 provides radial attachment of the rotating blades 16 to the rotor shaft 12.

A slot 42 extends through the platform 36 of each blade 16 to receive the locking pin 32. The slot 42 aligns with the circumferential groove 30 to provide a cavity into which the locking pin 32 is inserted (FIG. 1), thus axially securing each of the rotating blades 16 to the rotor shaft 12. The root portion 34, when engaged into the axial slot 26 on the rotor shaft 12, is the radial innermost portion of the rotating blade 16.

The platform portion 36 is attached to and integral with the root portion 34 of the blades 16. The platform portion 36 has a convex arcuate surface 44 and a concave arcuate surface 46 thereon.

In the prior art, the convex arcuate surface and concave arcuate surface of the blade platform portion are arcuate surfaces having an equal radius. When the root portions of the rotating blades are engaged within the substantially axial grooves disposed on the rotor shaft, axial movement of the rotating blades relative to each other toward the diffuser is not permitted. Since the curved surfaces of the blade platform portion are of equal radii, any axial movement of the rotating blades in the last rotating blade row relative to each other in the direction of the diffuser is prohibited by interference between the convex surface of one rotating blade with the concave surface of the next adjacent rotating blade. Although the prior art configuration of the platform portion thus provides an axial self-lock for the rotating blades in the direction of steam flow, removal of the rotating blades could only be effectuated after removal of a portion of the turbine cover is effected. This practice is both time consuming and expensive.

Utilization of the teachings of this invention provides the last blade row 14 with an array of rotating turbine blades 16 that may be removed from their position on the rotating shaft 12 without the necessity of first removing the turbine cover.

The interference which occurs in the prior art between the concave arcuate surface of one rotating blade and the convex arcuate surface of an adjacent rotating blade is eliminated by providing the convex arcuate surface 44 of each rotating blade 16 with a radius 48 that is greater than, and not concentric with a radius 50 of the concave arcuate surface 46 of the rotating blade 16. Provision of such a blade provides an increased circumferential spacing between adjacent centerpoints of the rotating blades 16 sufficient to eliminate interference which, in the prior art, prohibits axial movement of rotating blades toward the diffuser.

Figure 3:
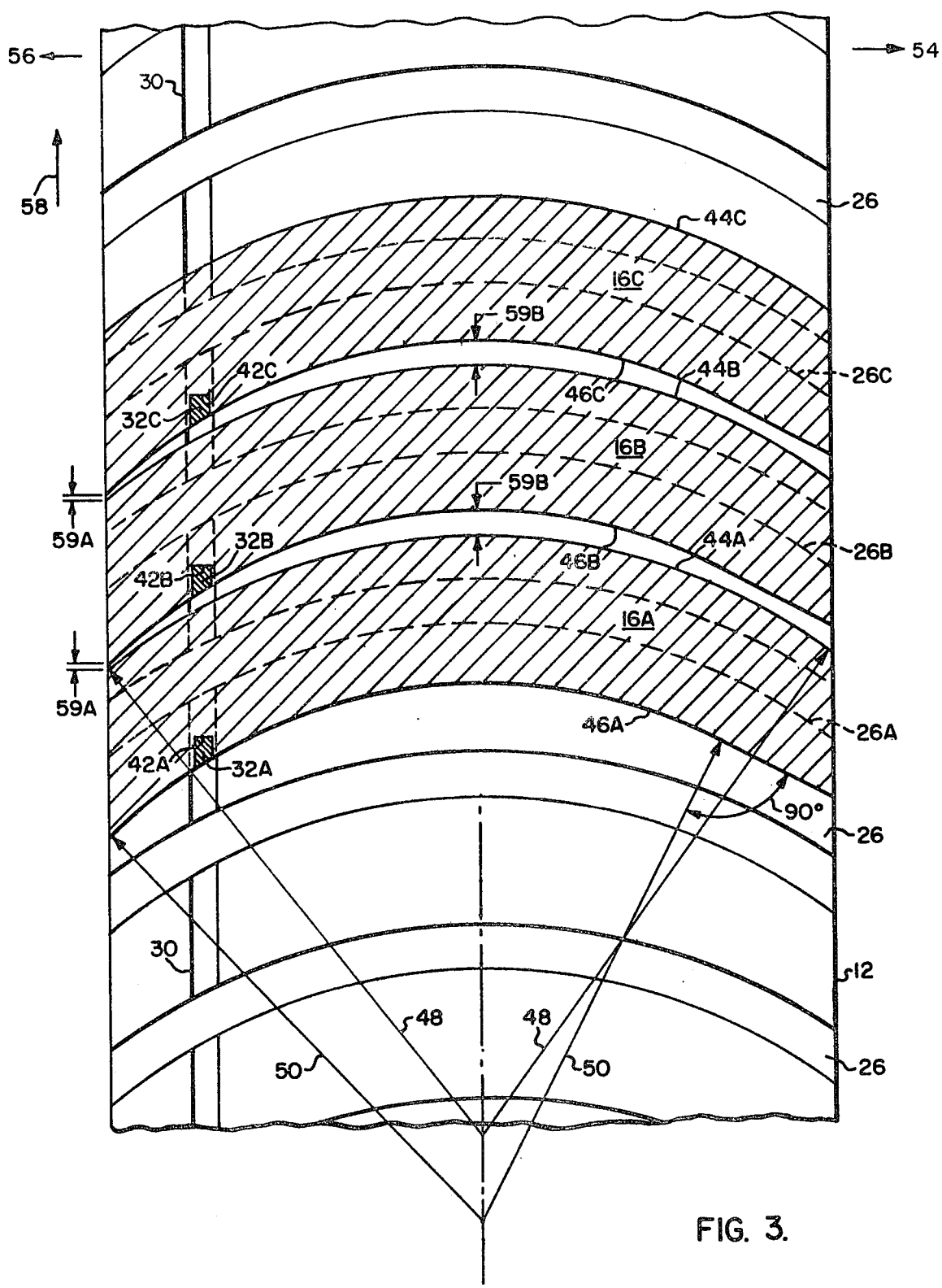
FIG. 3 is a plan view of an unrolled portion of a rotating member of an axial flow elastic fluid turbine apparatus; and, FIG. 4 is a plan view of an unrolled portion of a rotor shaft similar to FIG. 3.

Referring now to FIG. 3, a top view of an unrolled portion of a rotor shaft 12 having an array of rotating blades 16 thereon and embodying the teachings of this invention is illustrated. FIG. 3 shows a view looking downward on the top of the platform of the rotating blades 16, the airfoil portions 38 (FIG. 2) having been removed for clarity. The upstream side of the turbine, the direction opposite to the direction of the axial flow of steam, is indicated by a reference arrow 54, while the downstream side of the turbine, the direction of the axial flow, is indicated by a reference arrow 56. The presssure of the steam is, of course, greater on the upstream side 54 of the blade array 16 than on the downstream side 56. The direction of rotation of the rotor 12 is indicated by a reference arrow 58.

The rotor portion illustrated in FIG. 3 discloses three of the plurality of rotating blades 16 in the last rotating blade row 14. These blades are designated as 16A, 16B and 16C. The blades 16A, 16B and 16C are respectively disposed in three adjacent axial grooves 26A, 26B and 26C disposed in the rotor shaft 12. As viewed in the drawings, the blade 16A is the bottom blade in the portion of the rotor 12 shown, with the blade 16B disposed next proceeding in the direction of rotation 58 to the blade 16A, and the blade 16C disposed next proceeding in the direction of rotation 58 to the blade 16B.

Each of the rotating blades 16A, 16B, and 16C are displaced a predetermined circumferential distance 59 from one another. The distance between adjacent rotating blades 16 is a predetermined distance 59A when measured between adjacent trailing edges of the platforms 36, the distance increasing to a greater predetermined distance 59B when measured between adjacent centers of the platforms 36. In the prior art, the adjacent rotating blades are spaced a uniform circumferential distance apart, with no increase in spacing from distance 59A to distance 59B, as is the case with blades taught by this invention. Thus, axial movement toward the downstream side 56 of one of the rotating blades 16 is prohibited by interference from adjacent rotating blades 16. Each of the rotating blades 16A, 16B, and 16C are secured axially by the pin members 32A, 32B, and 32C passing through slots 42A, 42B, and 42C respectively. The pin members 32A, 32B, and 32C engage the groove 30 disposed circumferentially about the rotor shaft 12.

As shown in FIG. 3, each rotating blade 16A, 16B and 16C has the convex arcuate surface 44A, 44B and 44C, respectively thereon. Each convex arcuate surface 44 has the predetermined radius 48. Each rotating blade 16A, 16B, and 16C has the concave arcuate surface 46A, 46B, and 46C, respectively thereon. Each concave arcuate surface 46 has the predetermined radius 50. The radius 48 of the convex arcuate surface 44 is different from and larger than the radius 50 of the concave arcuate surface 46.

Since the convex arcuate surface 44 has a larger radius 48 than the radius 50 of the concave arcuate surface 46, the convex arcuate surface 44 of each rotatable blade 16 appears to "flatten-out" relative to the concave arcuate surface 46 of the adjacent rotating blade 16. This flattening-out of the second arcuate surface 44, plus the predetermined increasing circumferential spacing 59A to 59B between adjacent blades 16, permits axial movement of one rotating blade 16 relative to the others in the direction of the diffuser 28. With the axial interference of the prior art eliminated, replacement of the last rotating row 14 of rotating blades 16 is facilitated since the turbine casing need no longer be dismantled before replacing the rotating blades.

To remove a damaged blade 16 from the last rotating blade row 14 without first necessitating the dismantling of the turbine cover, entry into the turbine casing is effected through suitable means. If the second blade 16B, as viewed in FIG. 3, is assumed to be the damaged blade, the damaged second blade 16B as well as the adjacent first and third blades 16A and 16C respectively must be prepared and displaced prior to replacement of the damaged blade 16B.

To prepare the blades 16A, 16B and 16C for movement prior to replacement of the damaged blade 16B, the locking pin 32A that axially secures the first rotating blade 16A to the shaft 12 is sheared by suitable means. The first rotating blade 16A is then moved in its axial groove 26A toward the upstream side 54 of the turbine a predetermined distance, usually a distance of 1 inch, or until the blade platform contacts the shroud ring 24 of the stationary blades 20 (FIG. 1).

Moving the first rotating blade 16 the predetermined distance exposes the pin 32B on the second rotating blade 16B. The next step is to remove the locking pin 32B on the damaged rotating blade 16B. The second rotating blade 16B is then moved in its axial groove 26B toward the upstream side 54 of the turbine, exposing the locking pin 32C on the third rotating blade 16C. The pin 32C on the third rotating blade 16C is next removed and the rotating blade 16C is moved in its axial groove 26C toward the upstream side 54 of the turbine.

The damaged rotating blade 16B is thus prepared for removal. The next step in the method is to withdraw the rotating blade 16B from its axial groove 26B. To facilitate withdrawal of the damaged blade 16B, lubrication is provided in the axial groove 26B. The blade 16B is then pulled by suitable means toward the downstream side 56 of the turbine. To aid movement of the blade 16B, the airfoil portion (not shown) of the blade 16B is struck lightly and repeatedly to induce vibration within the blade 16B. Simultaneously with tapping the blade 16B, it is being withdrawn from the groove 26B. The blade 16B may be moved axially downstream in the direction of the axial flow into a space provided in the turbine casing, such as the space provided within the turbine casing as disclosed and claimed in the copending U.S. Pat. No.3,945,760, issued Mar. 23, 1976, assigned to the assignee of the present invention. Of course, the method taught by this invention may be practiced without providing a removal pocket as claimed in the above-cited copending application, and so long as sufficient axial clearance is provided within the turbine by any suitable means, any method which axially removes damaged rotating blades from the last rotating blade row is within the contemplation of this invention.

Figure 4:
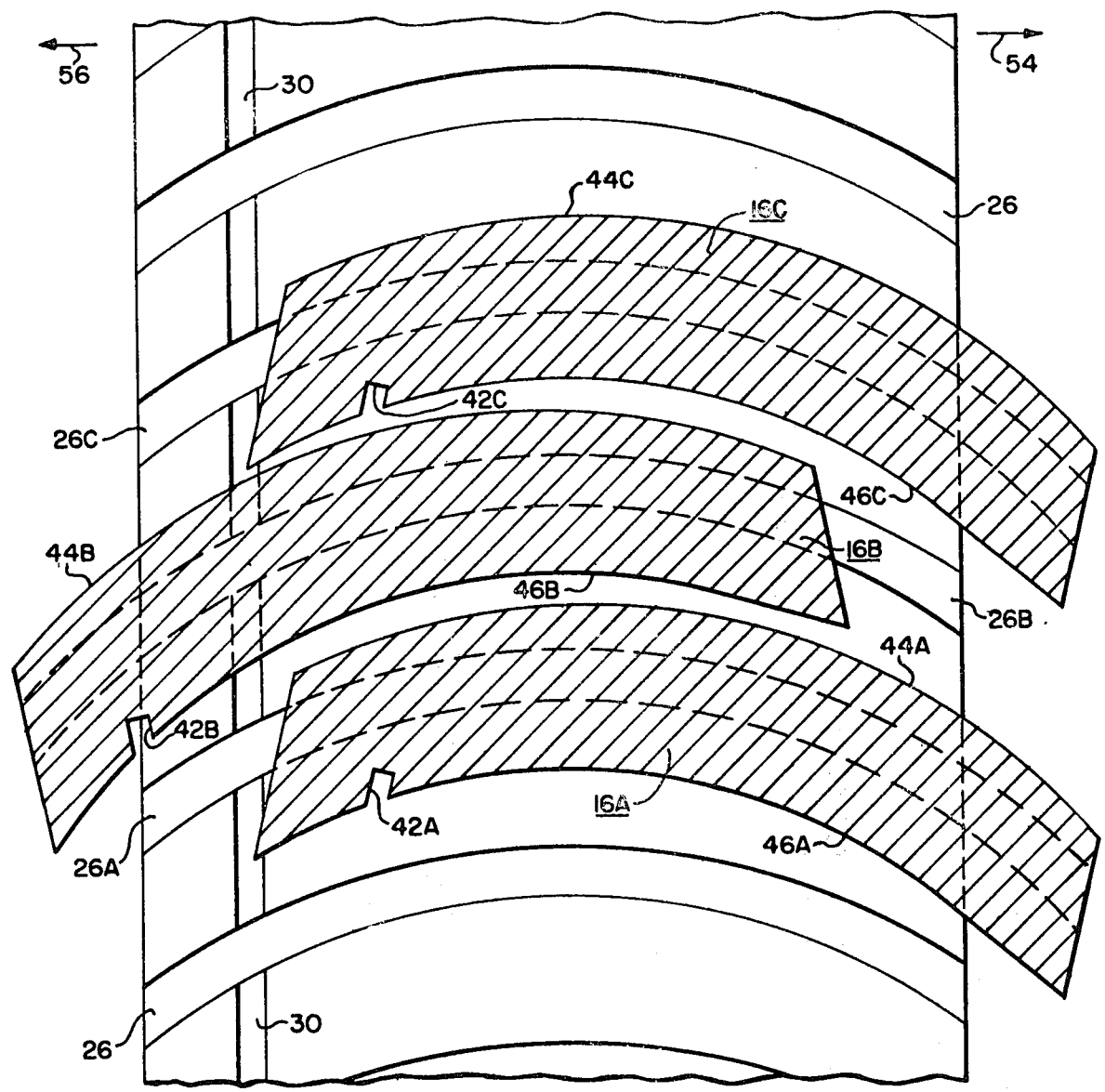

FIG. 4 illustrates a view similar to FIG. 3, showing the relative locations of the blades 16A, 16B, and 16C and showing the damaged blade 16B partially withdrawn from the axial groove 26B. Utilization of a blade configuration having a convex arcuate surface 44 having a greater radius 48 than the radius 50 of the concave arcuate surface 46, plus the predetermined circumferential spacing 59B between adjacent platforms 36 eliminates interference between platforms that is the case in the prior art and permits axial downstream movement of one rotating blade relative to the others.

However, some interference may occur between the tips 39 of the airfoils 38 on adjacent rotating blades 16. This interference is not critical since the airfoils 38 are flexible and interference at the tips 39 of the airfoils 38 can be eliminated easily during the removal procedure.

Once the damaged second blade 16B has been withdrawn from its axial groove 26B, a replacement blade is inserted into the axial groove 26B from which the damaged blade 16B was removed. The replacement blade is moved in the axial groove 26B toward its normal position and is resecured to the shaft 12 by suitable means. Blades 16A and 16C are also moved toward the downstream side 56 to their original positions and are repinned or otherwise resecured to the shaft 12 by suitable means.

It should be noted that it is possible to remove the damaged blade 16B without moving both the adjacent blades 16A and 16C. If, after removal of the fastening pins 32B and 32C, the blade 16C is moved toward the upstream side 54 of the turbine 10, there is sufficient circumferential clearance between the damaged blade 16B and the displaced adjacent blade 16C to permit the damaged blade 16B to be moved axially downstream and out of the groove 26B. This method, although the circumferential clearance exists, is not as advantageous as the method for axial removal described above. Empirical study has demonstrated that the method which displaces both adjacent blades 16A and 16C is a more expeditious method of removal due to the limited working space usually available in the portion of the turbine 10 axially downstream of the last rotating blade row 14 near the diffuser element 28 (FIG. 1).

It is seen that providing each blade in the last rotating blade row with a platform portion having a convex arcuate surface with a predetermined radius and a concave arcuate surface with a lesser radius, provides a circumferential distance between adjacent blades that is greater between the axial center of adjacent blades than the distance between adjacent downstream edges, and thus permits axial movement of one rotating blade relative to the others without interference from the other adjacent blades. Thus speedy removal and repair of damaged rotating blades in the last rotating blade row is facilitated, and the high costs of the time consuming repair process utilized previously is eliminated.

What is claimed is:

1. A method for replacing a particular rotatable blade disposed on a rotor in an axial flow turbine apparatus, said method comprising the steps of
   a. displacing a rotatable blade next proceeding in the direction of rotation of said rotor from said particular rotatable blade a predetermined distance in a direction opposite said axial flow,
   b. removing said particular rotatable blade in said direction of said axial flow,
   c. moving a replacement rotatable blade for said removed particular rotatable blade into said turbine apparatus in said direction opposite said axial flow, and, d. returning said displaced rotatable blade to its original position.

2. A method for replacing a particular rotatable blade disposed on a rotor in an axial flow turbine apparatus, said method comprising the steps of, a. displacing said particular rotatable blade and a rotatable blade disposed on each side thereof from their original circumferentially adjacent positions a predetermined distance within said turbine apparatus in a direction opposite to said axial flow, b. removing said particular rotatable blade from said turbine apparatus in said direction of said axial flow, c. moving a replacement rotatable blade for said removed particular rotatable blade into said turbine apparatus in said direction opposite to said axial flow, and, d. returning said rotatable blades to the original circumferentially adjacent positions.

3. The method of claim 2, wherein step (a) comprises the steps of 1. unfastening said particular rotatable blade and each of said adjacent rotatable blades from within said turbine apparatus, 2. moving sequentially one of said adjacent rotatable blades, said particular rotatable blade, and the other of said adjacent rotatable blades said predetermined distance in said direction opposite said axial flow.

4. The method of claim 2, wherein step (b) comprises the steps of 1. tapping an airfoil portion of said particular rotatable blade, and 2. withdrawing said particular rotatable blade from said turbine apparatus in said direction of said axial flow while simultaneously tapping said airfoil portion.

5. The method of claim 2, wherein step (c) comprises the steps of 1. inserting said replacement rotatable blade into said turbine apparatus in said direction opposite said axial flow, and 2. moving said replacement rotatable blade in said direction opposite said axial flow until said replacement blade aligns with said displaced adjacent rotatable blades.

6. The method of claim 2, wherein step (d) comprises the steps of 1. moving one of said adjacent rotatable blades and then the other of said adjacent blades in said direction of said axial flow to their original positions, and, 2. securing said replacement rotatable blade and each adjacent rotatable blade within said turbine apparatus.

7. The method of claim 2, wherein each rotatable blade has a platform portion having a convex surface and a concave surface thereon, in said original circumferentially adjacent positions the convex surface of the platform of the first of said adjacent rotatable blades is disposed adjacent to the concave surface of the platform of said particular rotatable blade and the concave surface of the platform of the second of said adjacent rotatable blades is disposed adjacent to the convex platform of said particular rotatable blade, and wherein step (a) comprises the sequential steps of 1. unfastening said first adjacent rotatable blade from within said turbine apparatus 2. moving said first adjacent rotatable blade in said direction opposite said axial flow said predetermined distance, 3. unfastening said particular rotatable blade from within said turbine apparatus, 4. moving said particular rotatable blade in said direction opposite said axial flow said predetermined distance, 5. unfastening said second adjacent rotatable blade from within said turbine apparatus, and, 6. moving said second rotatable blade in said direction opposite said axial flow said predetermined distance.

8. The method of claim 7, wherein step (b) comprises the steps of 1. lubricating a groove in which said particular rotatable blade is disposed within said turbine apparatus, 2. tapping an airfoil portion of said particular rotatable blade, and, 3. withdrawing said particular rotatable blade from said groove in said direction of said axial flow while simultaneously tapping said airfoil.

9. The method of claim 8, wherein step (c) comprises the steps of 1. inserting said replacement rotatable blade in said groove, and, 2. moving said replacement rotatable blade in said direction opposite said axial flow until said replacement rotatable blade aligns circumferentially with said displaced first and second adjacent rotatable blades.

10. The method of claim 9, wherein step (d) comprises the sequential steps of 1. moving said second adjacent rotatable blade in said direction of said axial flow to its original position, 2. resecuring said second adjacent rotatable blade within said turbine apparatus, 3. moving said replacement rotatable blade in said direction of said axial flow until it aligns circumferentially with said resecured second adjacent rotatable blade, 4. securing said replacement rotatable blade within said turbine apparatus, 5. moving said first adjacent rotatable blade in said direction of said axial flow to its original position, and, 6. resecuring said second adjacent rotatable blade within said turbine apparatus.

* * * * *